(12) United States Patent
Segawa

(10) Patent No.: US 7,237,851 B2
(45) Date of Patent: Jul. 3, 2007

(54) BRAKE HYDRAULIC PRESSURE CONTROL UNIT

(75) Inventor: Taro Segawa, Kariya (JP)

(73) Assignee: Advics Co., Ltd., Kariya, Aichi (JP)

( * ) Notice: Subject to any disclaimer, the term of this patent is extended or adjusted under 35 U.S.C. 154(b) by 0 days.

(21) Appl. No.: 10/880,449

(22) Filed: Jul. 1, 2004

(65) Prior Publication Data

US 2005/0001478 A1    Jan. 6, 2005

(30) Foreign Application Priority Data

Jul. 3, 2003    (JP) .............................. 2003-191168

(51) Int. Cl.
*B60T 8/36* (2006.01)
(52) U.S. Cl. .......................... 303/119.3; 303/DIG. 10; 303/DIG. 11
(58) Field of Classification Search ............ 303/119.2, 303/119.3, DIG. 10, 87, DIG. 11
See application file for complete search history.

(56) References Cited

U.S. PATENT DOCUMENTS

| | | | | | |
|---|---|---|---|---|---|
| 5,244,262 | A | * | 9/1993 | Kehl et al. ................ | 303/119.3 |
| 5,460,438 | A | * | 10/1995 | Hellmann et al. ........ | 303/119.3 |
| 5,577,813 | A | | 11/1996 | Zaviska | |
| 5,975,653 | A | | 11/1999 | Zaviska | |
| 6,102,495 | A | | 8/2000 | Zaviska | |
| 6,270,170 | B1 | * | 8/2001 | Isogai et al. ............. | 303/119.3 |
| 6,286,552 | B1 | * | 9/2001 | Shimbori et al. ............. | 303/87 |
| 6,336,688 | B1 | * | 1/2002 | Nakayasu ................. | 303/116.2 |
| 6,398,319 | B1 | * | 6/2002 | Wilson et al. ......... | 303/122.03 |
| 6,484,756 | B1 | | 11/2002 | Weber | |
| 6,494,545 | B2 | * | 12/2002 | Nakamura et al. ............ | 303/87 |
| 6,598,943 | B2 | * | 7/2003 | Harris ...................... | 303/113.4 |
| 6,871,672 | B2 | * | 3/2005 | Kurokawa et al. ............ | 303/87 |

FOREIGN PATENT DOCUMENTS

| | | |
|---|---|---|
| DE | 199 27 594 C1 | 2/2001 |
| DE | 101 61 407 A1 | 6/2002 |
| DE | 101 43 675 A1 | 2/2003 |
| JP | 8-502007 | 3/1996 |
| JP | 2000177559 A | 6/2000 |
| WO | WO 0201077 A1 * | 1/2002 |

* cited by examiner

*Primary Examiner*—Melanie Torres
(74) *Attorney, Agent, or Firm*—Buchanan Ingersoll & Rooney PC

(57) ABSTRACT

A brake hydraulic pressure control unit is proposed. It includes housing, a pump mounted in the housing, a reservoir for hydraulic fluid, and hydraulic pressure control valves. The pump is adapted to draw hydraulic fluid in the reservoir and return the thus drawn fluid into a hydraulic circuit. The hydraulic pressure valves are adapted to selectively discharge fluid in the hydraulic circuit into the reservoir, thereby controlling brake hydraulic pressure. The control unit may further include a pulsation damper for muffling noise produced from the pump. The reservoir and the pulsation damper are both separate members from the housing and are mounted to the housing. Thus, the volume of the housing and the capacities of the reservoir and the pulsation damper can be determined independently of each other.

15 Claims, 6 Drawing Sheets

BRAKE HYDRAULIC PRESSURE CONTROL UNIT

BACKGROUND OF THE INVENTION

This invention relates to a brake hydraulic pressure control unit for use in a vehicle for increasing and reducing brake hydraulic pressure using electric signals.

A conventional such brake hydraulic control unit is disclosed in JP patent publication 8-502007.

The brake hydraulic pressure control unit disclosed in this patent publication includes a housing in which is mounted a pump, a hydraulic fluid reservoir, hydraulic pressure control valves, and a motor for driving the pump. The pump draws hydraulic fluid in the reservoir and returns it to the brake line. The electronic control unit controls the brake pressure by selectively supplying hydraulic fluid into the hydraulic circuit (for pressure increase) and discharging hydraulic fluid into the reservoir (for pressure reduction) by opening and closing the hydraulic pressure control valves.

The brake hydraulic pressure control unit disclosed in JP patent publication 8-502007 includes a pulsation damper disposed between the discharge port of the pump and the hydraulic circuit for muffling the pump operation noise.

The reservoir and the pulsation damper are formed integrally with the housing. Specifically, as shown in FIG. 10, the reservoir comprises a bore 2 as a fluid chamber which is formed in the housing 1, a reservoir piston 3 inserted in the bore 2, a cover 4 coupled to the housing 1, and a spring 5 disposed between the reservoir piston 3 and the cover 4 for biasing the reservoir piston 3 to move it in such a direction that the volume of the fluid chamber decreases.

All the other conventional brake hydraulic pressure control units also have their reservoir formed as an integral part of the housing. Such an integral reservoir makes it difficult to reduce the size and cost of the entire unit for the following reasons.

If a plurality of reservoirs of such brake hydraulic pressure control units have lengths substantially equal to one another, their capacities are proportional to the square of their diameters and proportional to their piston strokes. Thus, if the capacity of the reservoir is fixed, as such a reservoir, one having a greater diameter and a shorter length should be selected in order to reduce the size of the brake hydraulic pressure control unit to a minimum. But a reservoir having a large diameter increases the depth of the housing 11 (dimension shown by "S" in FIGS. 10 and 11).

Conversely, if a reservoir having a greater length and shorter diameter is used while keeping its capacity unchanged, the height H of the housing will increase. The numeral 7 in FIGS. 10 and 11 indicates a pump-driving motor fastened to the housing.

The width w of the housing 1 is determined by the pitch of pipe connections (not shown) provided on the top 1a of the housing 1. Thus, if the depth s and/or height H is large, each side 1b naturally has a correspondingly large area. Such a housing is large in size.

The minimum value of the capacity of the reservoir is determined by the structure of the vehicle on which the brake hydraulic pressure control unit is to be mounted. The minimum value of the capacity of the reservoir in turn determines the minimum size of the housing as described above. Thus, if it is desired to use a housing having the allowable minimum size for the vehicle on which the control unit is to be mounted, a large number of housings that are different in type and size from one another have to be prepared according to vehicle types. One way to avoid this problem is to use uniform housings which can accommodate the largest reservoir. But such housings are unnecessarily too large to accommodate smaller reservoirs. Preparing a large number of housings that are different in size from one another and preparing uniform but oversized housings are both economically unfavorable.

For the pulsation damper, too, which is optionally provided as necessary, the greater its capacity, the more effectively it can damp pulsation. But if the damper, which is also an integral part of the housing as with the reservoir, is unnecessarily large in size, the size of the housing will also have to be unnecessarily increased, which pushes up the cost of the entire control unit.

If the size of the housing is reduced to a minimum, it will be difficult to increase the capacities of the reservoir and the pulsation damper even slightly.

An object of this invention is to provide a low-cost, compact brake hydraulic pressure control unit comprising a housing and a reservoir and optionally a pulsation damper in which the size of the housing can be determined irrespective of the capacities of the reservoir and the pulsation damper.

SUMMARY OF THE INVENTION

According to this invention, there is provided a brake hydraulic pressure control unit comprising a housing, a pump mounted in the housing, a reservoir for hydraulic fluid, and hydraulic pressure control valves, the pump being operated to draw hydraulic fluid in the reservoir and return the thus drawn fluid into a hydraulic circuit, the hydraulic pressure valves being adapted to selectively discharge fluid in the hydraulic circuit into the reservoir, thereby controlling brake hydraulic pressure, the reservoir being a separate member from the housing and mounted to the housing.

Preferably:

① the reservoir is selected from among a plurality of reservoirs having different capacities from one another;

② the reservoir mounted to the housing and the other reservoirs not selected have common connecting portions at which they can be connected to the housing;

③ each reservoir includes a piston having a diameter and a connecting portion at which the reservoir is connected to the housing, the connecting portion having a diameter smaller than the diameter of the piston;

④ each reservoir includes a casing manufactured by non-cutting method; and/or

⑤ each reservoir includes a casing formed of a corrosion-resistant metal or resin.

This brake hydraulic pressure control unit may further comprise a pulsation damper mounted to the housing between a discharge port of the pump and the hydraulic circuit, the pulsation damper being a separate member from the housing.

Preferably:

① the pulsation damper is a volume damper in the shape of a container;

② the pulsation damper is selected from among a plurality of pulsation dampers having different capacities from one another;

③ the plurality of pulsation dampers have common connecting portions at which any of them can be connected to the housing;

④ each pulsation damper comprises a body having an external diameter and a connecting portion at which the damper is connected to the housing, the connecting portion having a diameter smaller than the external diameter of the body of the first pulsation damper;

⑤ each pulsation damper includes a casing manufactured by non-cutting method;
⑥ each pulsation damper includes a casing formed of a corrosion-resistant metal or resin; and/or
⑦ each pulsation damper is a one-piece damper consisting of a casing.

Further preferably, the reservoir and the pulsation damper are mounted to the housing so as to be virtually unseparable from the housing or separable only with extreme efforts.

By forming the reservoir and the housing separately from each other, it is possible to select the reservoir from among a plurality of reservoirs having different capacities according to the type of vehicle on which the control unit of the invention is to be mounted, without changing the size of the housing. Thus, housings of the same type and size can be used for a variety of different vehicle types.

The volume of the housing has no influence on the capacity of the reservoir, and vice versa. Thus, any of a plurality of reservoirs having different capacities can be mounted to a single, common housing having a necessary minimum volume and size. The capacity of the reservoir is restricted only by the type of vehicle on which the control unit is to be mounted, and not by the size of the housing.

This is also true with the relation between the housing and the pulsation damper of the present invention.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 1:
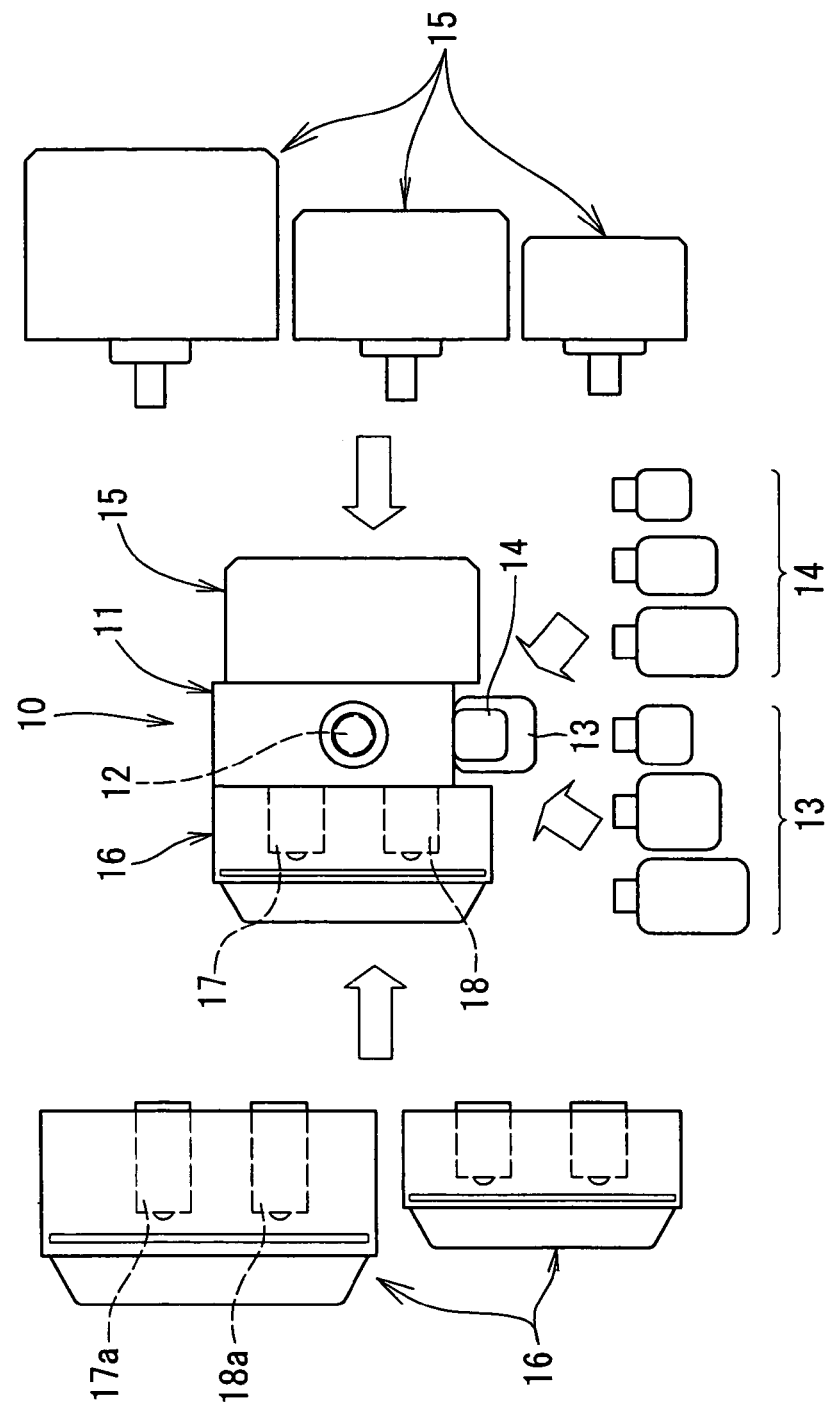
FIG. 1 is a schematic side view of a brake hydraulic pressure control unit embodying this invention.

Now referring to the drawings, the embodiment of the present invention will be described.

As shown in FIG. 1, the brake hydraulic pressure control unit according to this invention, generally designated by 10, comprises a housing 11 in which is mounted a pump 12, a reservoir 13 in which is stored hydraulic fluid discharged from a hydraulic circuit, a pulsation damper 14 for muffling noise originating from the pump 12, a motor 15 for driving the pump 12, and an electronic control unit 16. The motor 15 and the electronic control unit 16 are fastened to one side and the other side of the housing 11, respectively. The reservoir 13 and the pulsation damper 14 are mounted to the bottom of the housing 11.

The reservoir 13 and the pulsation damper 14 are manufactured separately from each other and from the housing 11, and are mounted to the housing 11. Thus, the housing 11 itself is compact in size and can be mounted on a variety of different vehicles without changing its design or size at all.

The reservoir 13 and the pulsation damper 14 are selected from among a plurality of reservoirs and dampers having different capacities, respectively. Similarly, the motor 15 is selected from among a plurality of motors having different outputs, and the electronic control unit 16 can be selected from among a plurality of different control units and combined with the housing 11.

Figure 2:
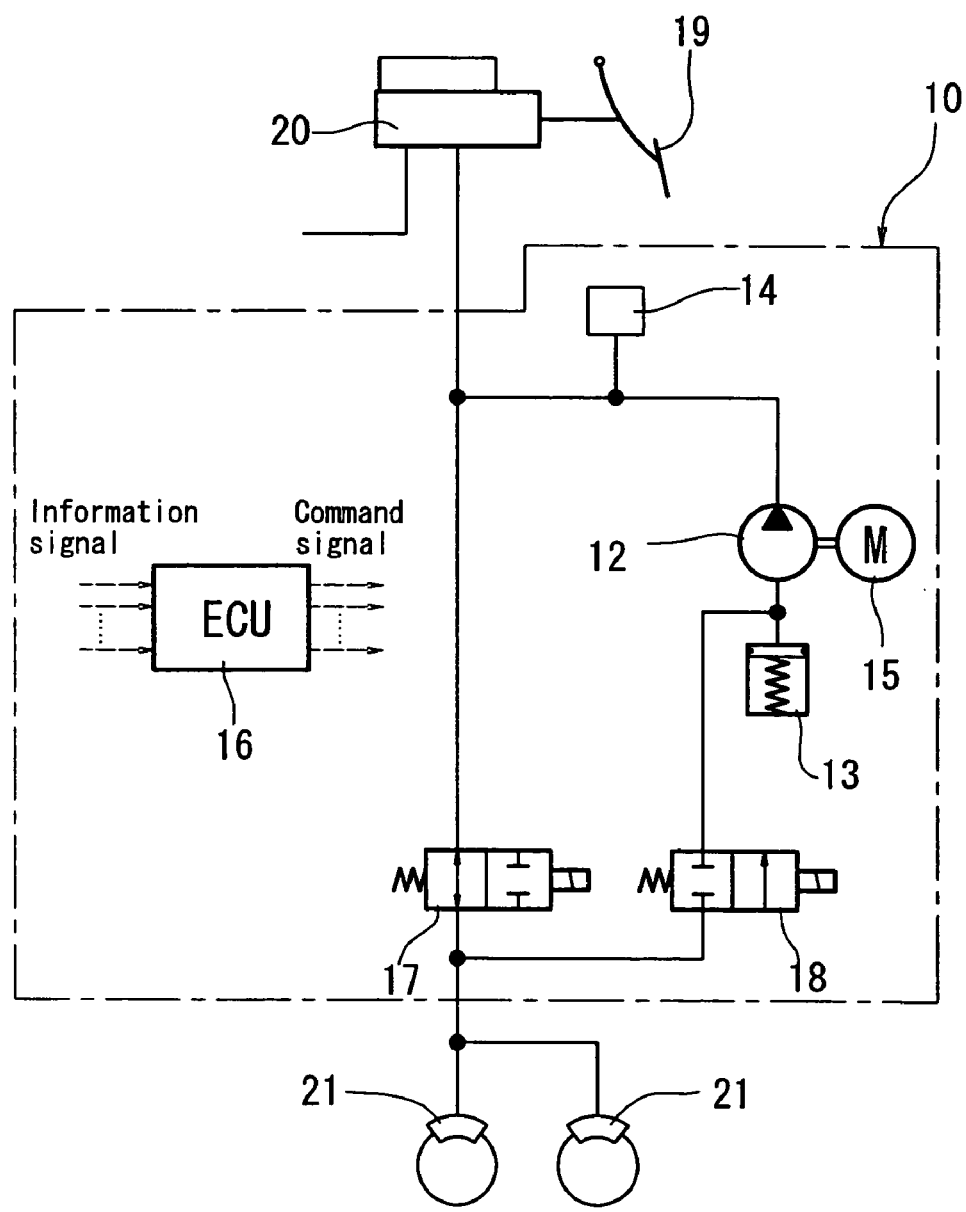
FIG. 2 is a basic circuit diagram of a hydraulic brake system of a vehicle which includes a brake hydraulic control unit such as the one according to the present invention.

FIG. 2 shows the basic circuit structure of a hydraulic brake system for a vehicle which is provided with the brake hydraulic pressure control unit 10 according to this invention, which includes, as described above, the pump 12, reservoir 13, pulsation damper 14, and motor 15, and further includes a pressure increase valve 17 and a pressure reduction valve 18 (see FIG. 1). Besides the control unit 10, this brake system includes a brake pedal 19, a tandem master cylinder 20 and wheel cylinders 21. In the drawings and the description, only one of the two hydraulic circuits is shown and described.

In FIG. 2, the lines enclosed in one-dot line are formed in the housing 11. The pump 12 is mounted in the housing 11 as described above. The pump 12 may be a double action piston pump. Since such a pump is well-known in the art, its detailed structure is neither described nor shown here.

The pressure increase valve 17, which opens and closes a line for increasing pressure, and the pressure reduction valve 18, which opens and closes a line for reducing pressure, are mounted in the housing 11. One or some elements (e.g. coils 17a and 18a) of the pressure increase valve 17 and pressure reduction valve 18 are integral parts of the electronic control unit 16. When the electronic control unit 16 is fastened to the housing 11, such elements are coupled or joined to the remaining mechanical elements of the valves 17 and 18, which are mounted in the housing 11.

As described above, the reservoir 13 and the pulsation damper 14 are manufactured separately from the housing 11 and mounted to the housing as shown in FIG. 1.

FIGS. 3–8 show how different reservoirs 13 are mounted to the housing 11 in several examples.

Figure 3:
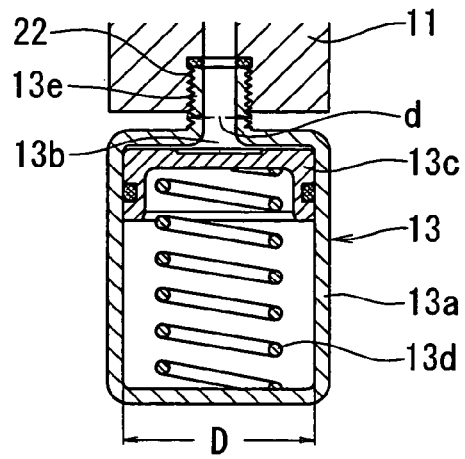
FIG. 3 is a sectional view of a reservoir as mounted to the housing of the control unit of FIG. 1.
Figure 4:
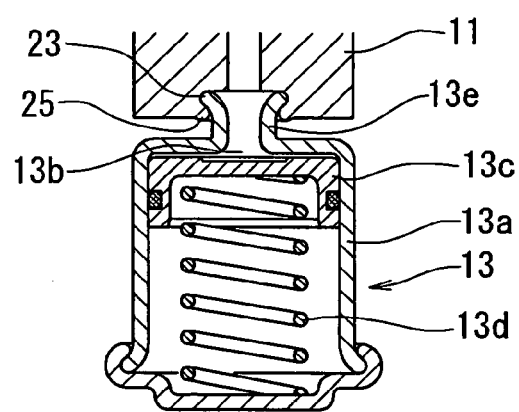
FIG. 4 is a sectional view of a different reservoir as mounted to the housing.
Figure 5:
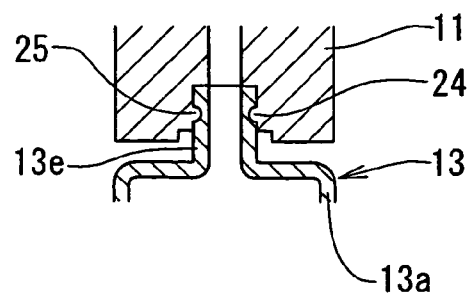
FIG. 5 is a sectional view of a still another reservoir as mounted to the housing.

As shown in FIGS. 3 and 4, the reservoir 13 comprises a casing 13a defining a fluid storage chamber 13b, a reservoir piston 13c that changes the volume of the chamber 13b by moving axially of the casing, and a spring 13d biasing the reservoir piston 13c in such a direction that the volume of the fluid storage chamber 13b decreases. The reservoir 13 is selected from among a plurality of reservoirs having different capacities and having connecting portions 13e that are identical in shape and size.

In the arrangement of FIG. 3, the connecting portion 13e has a threaded outer surface 22 which is threadedly engaged in a threaded hole formed in the housing 11 to mount the reservoir 13 to the housing 11. But in order to positively prevent the reservoir from being inadvertently disconnected from the housing 11, the reservoir 13 should rather be connected to the housing 11 in such a way that once they are joined together, they are practically unseparable or separable only with extreme efforts.

Figure 6:
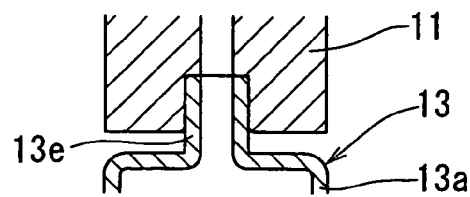
FIG. 6 is a sectional view of a yet another reservoir as mounted to the housing.
Figure 7:
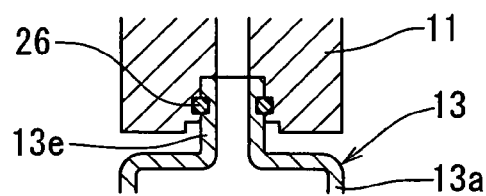
FIG. 7 is a sectional view of a further different reservoir as mounted to the housing.
Figure 8:
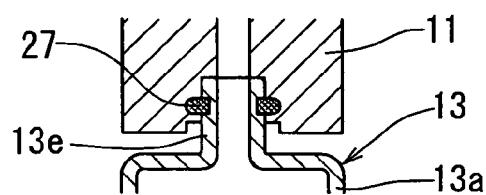
FIG. 8 is a sectional view of another reservoir as mounted to the housing.

Such joint arrangements, i.e. unseparable joint arrangements are shown in FIGS. 4–8. In the arrangement of FIG. 4, the connecting portion 13e has a large-diameter portion 23 (or a flange instead) which is engaged in a recess formed in the housing 11 by plastically deforming a portion 25 of the housing 11. The connecting portion 13e of FIG. 5 has a recess 2 in which a rib 25 is engaged by plastically deforming the rib 25. In FIG. 6, the connecting portion 13e is pressed into the housing 11. In FIG. 7, the connecting portion 13e is fastened to the housing 11 by a pin or pins 26 that are driven into the housing 11 so as to be received partly in a groove formed in the inner surface of a hole of the housing 11 into which the connecting portion 13e of the reservoir 13 is inserted, and partly in a groove formed in the outer surface of the connecting portion 13e so as to radially oppose the former groove. In the arrangement of FIG. 8, the connecting portion 13e of the reservoir 13 and the housing 11 are joined together by plastic injection. Specifically, molten resin is poured into opposed grooves formed in the inner surface of a hole of the housing 11 into which the connecting portion 13e of the reservoir 13 is inserted and in the outer surface of the connecting portion 13e, respectively, from outside of the housing. In order to join the housing 11 and the reservoir 13 together in such a way that they are unseparable or separable only with extreme efforts, two or more of the arrangements of FIGS. 3–8 may be combined.

Preferably, as shown in FIG. 3, the connecting portion 13e has a diameter d that is smaller than the diameter D of the reservoir piston 13c so that the diameter of the reservoir 13 can be freely decided irrespective of the size of the housing 11, or the size of the housing 11 can be reduced irrespective of the diameter of the reservoir 13.

Preferably, the casing 13a of the reservoir 13 is manufactured by non-cutting method for higher productivity. For example, the casing 13a of FIG. 4 comprises two separate parts, i.e. a body portion having the connecting portion 13e, which is, in this arrangement, formed by drawing, and a bottom cover formed by pressing. These two parts are joined together by caulking.

For improved corrosion resistance, the housing 13a of the reservoir 13 is preferably formed of aluminum, stainless steel or a resin.

Preferably, the pulsation damper 14 is also mounted to the housing 11 in the same manner as the reservoir 13 is mounted to the housing 11. Specifically, they are joined together using one or a combination of the joint arrangements shown in FIGS. 3–8.

Preferably, a connecting portion 14a of the pulsation damper 14 has a diameter that is smaller than the external diameter D of the body of the pulsation damper 14 so that the diameter of the body of the damper 14 can be freely designed irrespective of the size of the housing 11, or the size of the housing 11 can be reduced irrespective of the diameter of the body of the damper 14.

For the same reasons as set forth above with respect to the reservoir, the pulsation damper 14 is preferably manufactured by non-cutting method, and is formed of aluminum, stainless steel or a resin.

Figure 9:
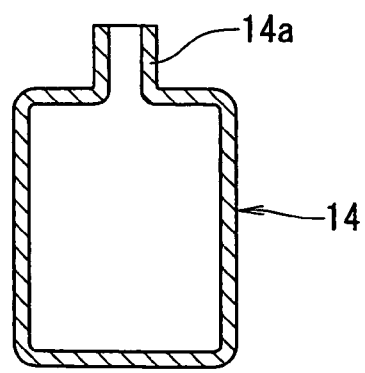
FIG. 9 is a sectional view of a pulsation damper to be mounted to the housing.
Figure 10:
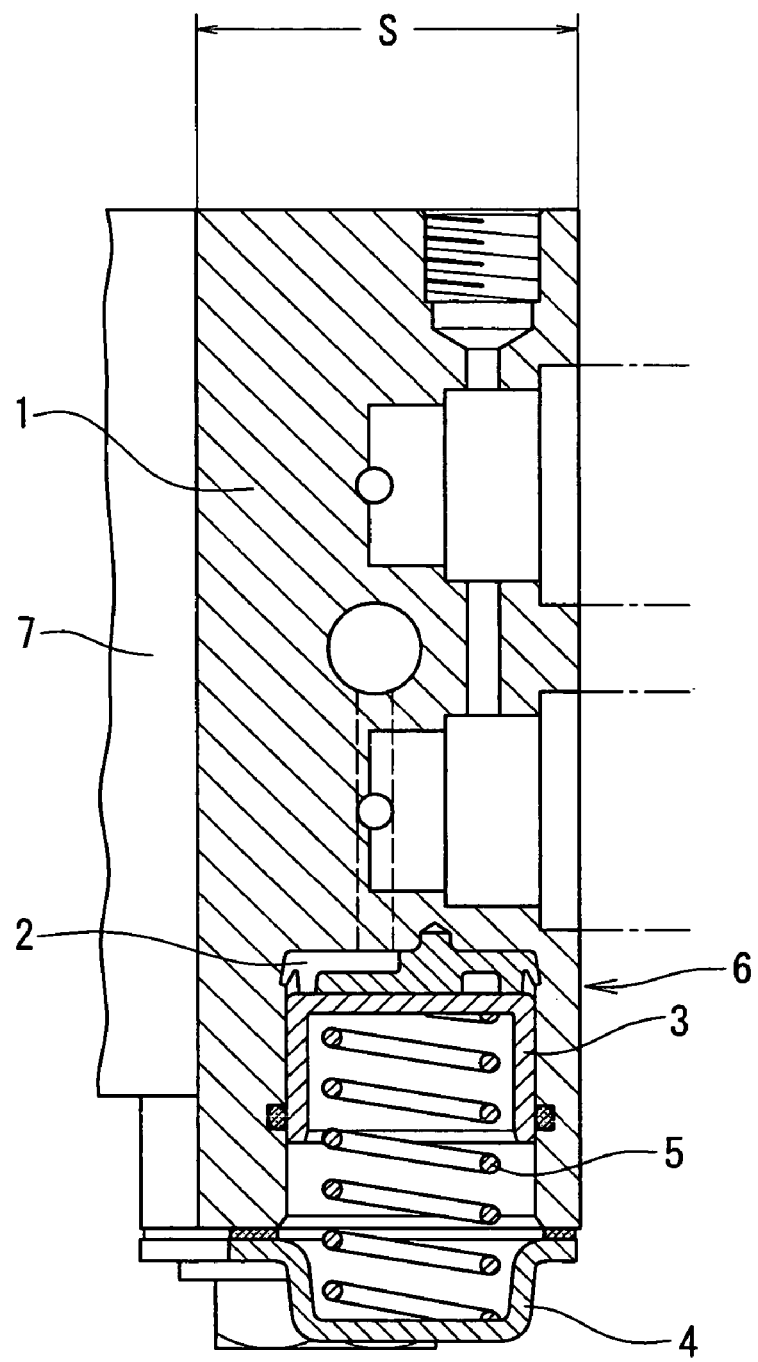
FIG. 10 is a sectional view of a reservoir of the brake hydraulic pressure control unit disclosed in Japanese patent publication 8-502007, which is a one-piece member of the housing.
Figure 11:
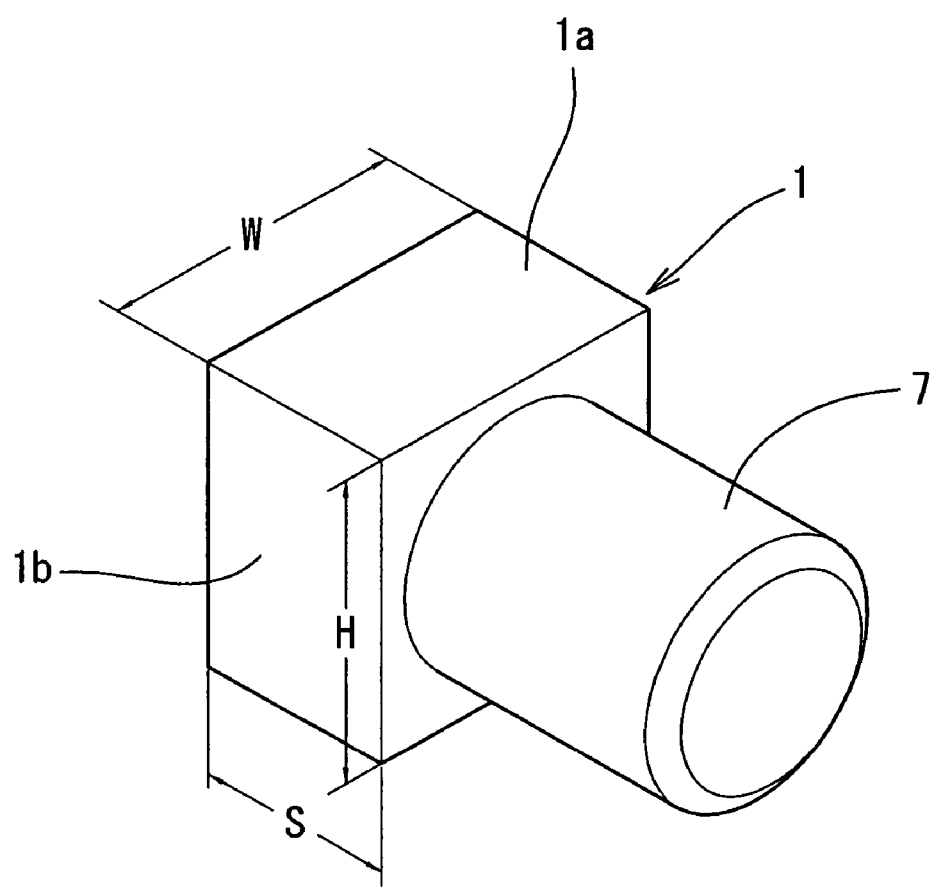
FIG. 11 is a view for explaining the dimensions of the housing.

The pulsation damper 14 is preferably a one-piece member as shown in FIG. 9 because it is simple in structure and inexpensive.

Unlike conventional reservoir and damper, which are actually integral parts of the housing, the reservoir and the damper of the brake hydraulic pressure control unit according to the present invention are manufactured separately from the housing and joined to the housing. Thus, the reservoir and the damper can be selected from among a plurality of reservoirs and dampers having different capacities according to the type of vehicle on which the brake hydraulic control unit according to the present invention is to be mounted, and then can be joined to the housing. The same housing can thus be used for a variety of different vehicles. Such housings can be mass-produced at a low cost because they may be identical to each other in spite of the fact that they can be mounted on different types of vehicles.

Another advantage of this invention is that the housing can be designed more freely than conventional such housings. Thus, it is possible to reduce the size of the housing and the material cost of the housing. Since the housing can be designed more freely, the manufacturer can more easily answer customers' requirements.

Both the reservoir and the pulsation damper are small in the pressure-bearing surface and simple in structure. This also contributes to reduction in cost and size.

Overall, the brake hydraulic pressure control unit according to this invention can be designed with greater freedom, and manufactured at a low cost with a reduced size.

What is claimed is:

1. A brake hydraulic pressure control unit comprising a housing, a pump mounted in said housing, a reservoir positioned to receive hydraulic fluid discharged from a hydraulic circuit, and hydraulic pressure control valves, said pump being operated to draw hydraulic fluid in said reservoir and return the thus drawn fluid into said hydraulic circuit, said hydraulic pressure valves being adapted to selectively discharge fluid in said hydraulic circuit into said reservoir, thereby controlling brake hydraulic pressure, said reservoir defined by a fluid chamber formed in a casing which is separate from said housing and which includes a connecting portion mounted to said housing, wherein said casing is held stationary relative to said housing, said casing forming a passage extending through the connecting portion and into the housing, for communicating the fluid chamber with the pump, the brake hydraulic pressure control unit including at least one additional reservoir having a different capacity from said reservoir mounted to said housing, wherein said at least one additional reservoir is not mounted to said housing but can be mounted to said housing instead of said reservoir mounted to said housing, wherein said reservoir mounted to said housing and said at least one additional reservoir have common connecting portions at which said reservoir mounted to said housing is connected to said housing and said at least one additional reservoir can be connected to said housing.

2. The brake hydraulic pressure control unit according to claim 1, wherein said reservoir includes a piston slidable in said fluid chamber, said connecting portion having a diameter smaller than the diameter of said piston.

3. The brake hydraulic pressure control unit according to claim 1, wherein said casing is manufactured by non-cutting method.

4. The brake hydraulic pressure control unit according to claim 1, wherein said casing is formed of a corrosion-resistant metal or resin.

5. The brake hydraulic pressure control unit according to claim 1, further comprising a pulsation damper mounted to said housing between a discharge port of said pump and said hydraulic circuit, said pulsation damper being a separate member from said housing.

6. The brake hydraulic pressure control unit according to claim 5, wherein said pulsation damper is a volume damper in the shape of a container.

7. The brake hydraulic pressure control unit according to claim 5, further comprising at least one additional pulsation damper having a different capacity from said pulsation damper mounted to said housing, wherein said at least one additional pulsation damper is not mounted to said housing but can be mounted to said housing instead of said pulsation damper mounted to said housing.

8. The brake hydraulic pressure control unit according to claim 7, wherein said pulsation damper mounted to said housing and said at least one additional pulsation damper have common connecting portions at which said pulsation damper mounted to said housing is connected to said housing and said at least one additional pulsation damper can be connected to said housing.

9. The brake hydraulic pressure control unit according to claim 5, wherein said pulsation damper comprises a body having an external diameter and a connecting portion at which said pulsation damper is connected to said housing, said connecting portion of said body having a diameter smaller than the external diameter of said body of said pulsation damper.

10. The brake hydraulic pressure control unit according to claim 5, wherein said pulsation damper includes a casing manufactured by non-cutting method.

11. The brake hydraulic pressure control unit according to claim 5, wherein said pulsation damper includes a casing formed of a corrosion-resistant metal or resin.

12. The brake hydraulic pressure control unit according to claim 5, wherein said pulsation damper is a one-piece damper consisting of a casing.

13. The brake hydraulic pressure control unit according to claim 1 further including a piston slidably disposed in said chamber and being spring biased toward said passage.

14. A brake hydraulic pressure control unit comprising a housing, a pump mounted in said housing, a reservoir for hydraulic fluid, and hydraulic pressure control valves, said pump being operated to draw hydraulic fluid in said reservoir and return the thus drawn fluid into a hydraulic circuit, said hydraulic pressure valves being adapted to selectively discharge fluid in said hydraulic circuit into said reservoir, thereby controlling brake hydraulic pressure, said reservoir comprising a casing separate from said housing and located outside of said housing, and including a connecting portion mounted to said housing, said casing forming a fluid chamber and a passage extending through the connecting portion and into the housing, for communicating the chamber with the pump, the brake hydraulic pressure control unit including at least one additional reservoir having a different capacity from said reservoir mounted to said housing, wherein said at least one additional reservoir is not mounted to said housing but can be mounted to said housing instead of said reservoir mounted to said housing, wherein said reservoir mounted to said housing and said at least one additional reservoir have common connecting portions at which said reservoir mounted to said housing is connected to said housing and said at least one additional reservoir can be connected to said housing.

15. The brake hydraulic pressure control unit according to claim 14, wherein said reservoir is positioned to store hydraulic fluid discharged from the hydraulic circuit.

* * * * *